(12) United States Patent
Nemoto

(10) Patent No.: US 10,254,004 B2
(45) Date of Patent: Apr. 9, 2019

(54) AIRFLOW-DIRECTION ADJUSTMENT DEVICE

(71) Applicant: NIFCO INC., Yokosuka-shi, Kanagawa (JP)

(72) Inventor: Takehiko Nemoto, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 380 days.

(21) Appl. No.: 15/104,058

(22) PCT Filed: Dec. 11, 2014

(86) PCT No.: PCT/JP2014/082863
§ 371 (c)(1),
(2) Date: Jun. 13, 2016

(87) PCT Pub. No.: WO2015/087975
PCT Pub. Date: Jun. 18, 2015

(65) Prior Publication Data
US 2016/0313025 A1    Oct. 27, 2016

(30) Foreign Application Priority Data

Dec. 12, 2013 (JP) ................................. 2013-256623

(51) Int. Cl.
*F24F 13/15*    (2006.01)
*F24F 13/06*    (2006.01)
(Continued)

(52) U.S. Cl.
CPC ............. *F24F 13/15* (2013.01); *B60H 1/345* (2013.01); *B60H 1/3421* (2013.01); *F24F 13/06* (2013.01);
(Continued)

(58) Field of Classification Search
CPC ...... B60H 1/34; B60H 1/3442; B60H 1/3435; B60H 1/3428; B60H 1/3421; B60H 1/3414
(Continued)

(56) References Cited

U.S. PATENT DOCUMENTS

| | | | |
|---|---|---|---|
| 5,364,303 A | * | 11/1994 | Terry ..................... B60H 1/345 454/155 |
| 5,690,550 A | | 11/1997 | Mikowski |

(Continued)

FOREIGN PATENT DOCUMENTS

| | | |
|---|---|---|
| DE | 102011115178 A1 | 3/2013 |
| FR | 2710879 A1 | 4/1995 |

(Continued)

OTHER PUBLICATIONS

PCT International Search Report of PCT/JP2014/082863.
Europe Patent Office, "Search Report for European Patent Application No. 14870499.2," dated Oct. 18, 2017.

*Primary Examiner* — Steven B McAllister
*Assistant Examiner* — Ko-Wei Lin
(74) *Attorney, Agent, or Firm* — Manabu Kanesaka

(57) ABSTRACT

An airflow-direction adjustment device includes a plurality of fins disposed approximately in parallel relative to a support portion inside a case, and located on right and left side faces wherein one end side in a plate width direction is pivotally supported turnably; a link mechanism associating two or more fins; and a switch linked to the link mechanism to adjustably switch between a parallel air-blowing mode wherein the fins become approximately parallel to each other, and a scattered air-blowing mode wherein two or more fins are turned in directions opposite to each other. The switch is movably assembled to an intermediate fin, and the link mechanism includes a first link turnably connecting one end side corresponding to other end sides in a plate width (Continued)

direction of first fins disposed on both adjacent sides of the intermediate fin respectively, and turnably connecting a corresponding other end side to the switch respectively.

4 Claims, 16 Drawing Sheets

(51) Int. Cl.
    *B60H 1/34*     (2006.01)
    *F24F 13/075*     (2006.01)
    *F24F 13/14*     (2006.01)

(52) U.S. Cl.
    CPC ........ *F24F 13/075* (2013.01); *F24F 13/1426* (2013.01); *B60H 2001/3471* (2013.01)

(58) Field of Classification Search
    USPC .................................................. 454/155, 152
    See application file for complete search history.

(56) References Cited

U.S. PATENT DOCUMENTS

2005/0239391 A1\* 10/2005 Shibata ................ B60H 1/3421
                                                      454/155
2013/0225058 A1     8/2013 Ross et al.

FOREIGN PATENT DOCUMENTS

| JP | 04061247 U | \* | 5/1952 |
| JP | S57-54935 U | | 3/1982 |
| JP | S59-91531 U | | 6/1984 |
| JP | S60-178741 U | | 11/1985 |
| JP | H03-87155 U | | 9/1991 |
| JP | H04-61247 U | | 5/1992 |
| JP | 2002-277040 A | | 9/2002 |
| JP | S59-72440 U | | 1/2008 |

\* cited by examiner (Schematic Side View of Respective Links)

(Schematic Side View of Respective Links)

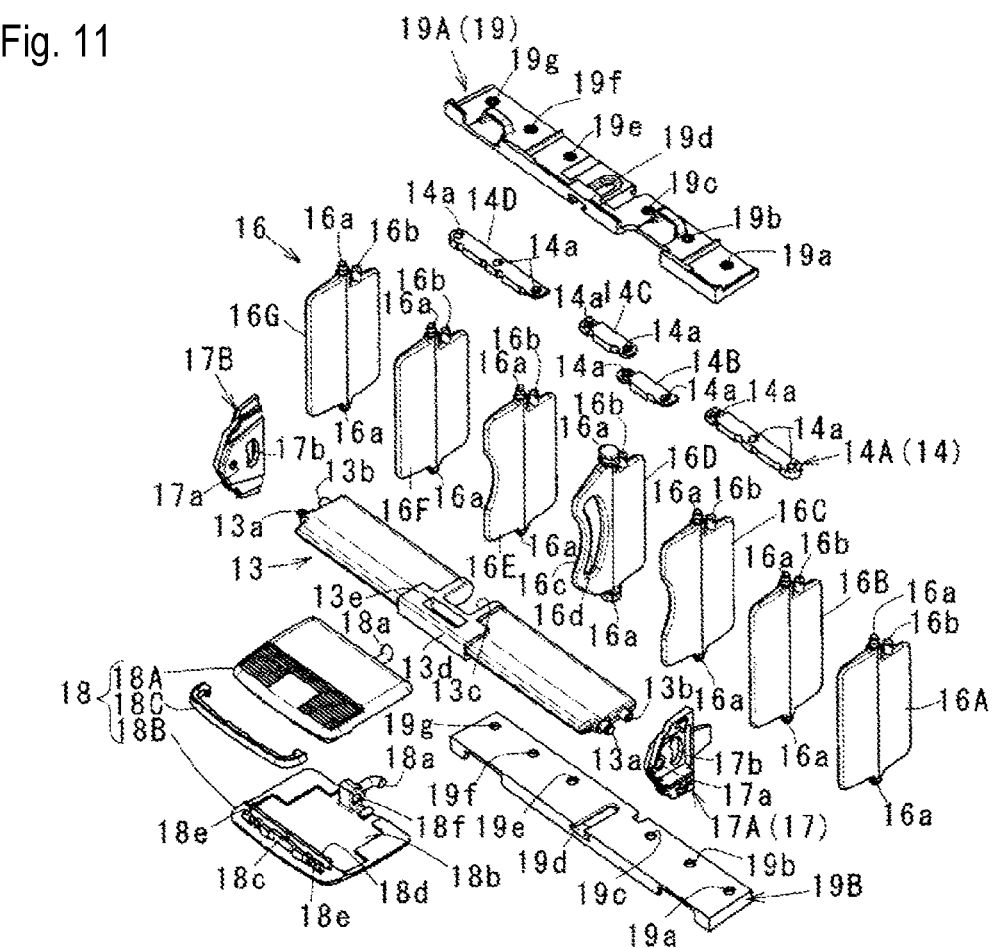

Fig. 12(a)
Fig. 12(b)
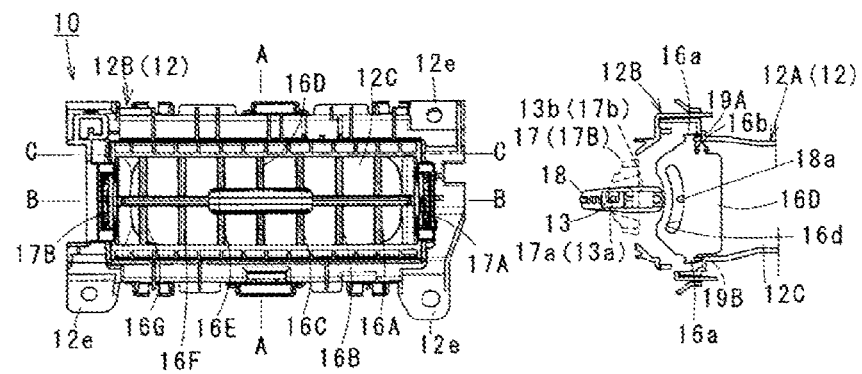
Fig. 12(c)
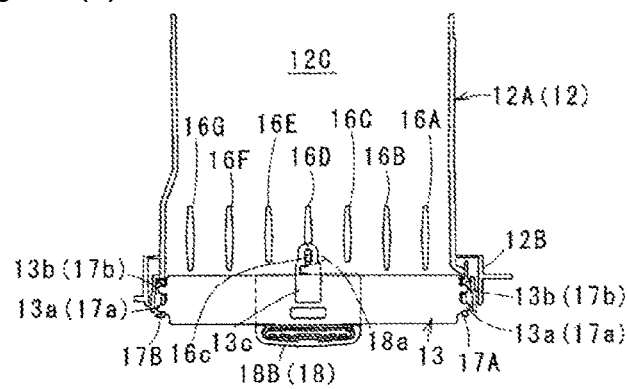
Fig. 12(d)
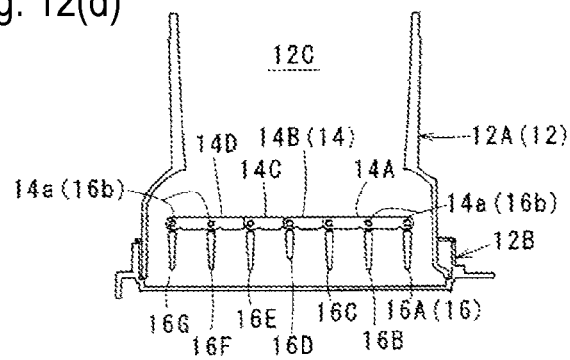

AIRFLOW-DIRECTION ADJUSTMENT DEVICE

RELATED APPLICATIONS

The present application is National Phase of International Application No. PCT/JP2014/082863 filed Dec. 11, 2014, and claims priority from Japanese Application No. 2013-256623, filed Dec. 12, 2013, the disclosure of which is hereby incorporated by reference herein in its entirety.

FIELD OF TECHNOLOGY

The present invention relates to an airflow-direction adjustment device varying a flow of air toward a front-side opening portion through a fin in a cooling and heating equipment, air conditioning equipment, or the like, and especially varying the fin through a link mechanism.

BACKGROUND ART

FIGS. 16(a) and 16(b) show an airflow-direction adjustment device for a vehicle disclosed in FIG. 1 and FIG. 2 of Patent Document 1. The structure comprises a case (frame) set in such a way as to blow out air to outside from a front-side opening portion; five fins 12, 14, 16, 18, and 20 disposed approximately in parallel relative to an opposed support portion (second connection element) 44 inside the case 10, and located on right and left side faces wherein one end side in a plate width direction is pivotally supported turnably through pins 42 respectively; a link mechanism associating four fins 12, 14, 18, and 20 among the aforementioned fins to move; a button 54 and an operation element 52 as a switch linked to the link mechanism; and the like. The aforementioned structure can adjustably switch between a parallel air-blowing mode in FIG. 16(a) wherein the aforementioned fins become approximately parallel to each other, and a scattered air-blowing mode in FIG. 16(b) wherein among the aforementioned fins, the first fins 14 and 18 sandwiching the intermediate fin 16, and the second fins 12 and 20 are turned in the directions opposite to each other.

Here, the link mechanism is interposed between a first connection element 24 disposed movably forward against an urging force of a return spring 40, and each fin 12, 14, 16, 18, and 20. Namely, in the example, the link mechanism is formed by pins 22 located on one side face of each fin and provided approximately in a middle in the plate width direction; and slot-shaped links 26, 28, 30, 32, and 34 provided in the first connection element 24 and fitting into the pins 22. The links 26 and 28, and the links 32 and 34 are formed in arc grooves inclined in the directions opposite to each other. Then, in order to switch from the parallel air-blowing mode in FIG. 16(a) to the scattered air-blowing mode in FIG. 16(b), when the button 54 is pushed, the first connection element 24 moves forward against the urging force of the spring 40 by the operation element 52, and a state after the movement thereof is maintained through a latch mechanism 56. In the process, each fin 12, 14, 16, 18, and 20 is guided in a groove shape of the links 26, 28, 30, 32, and 34 wherein each pin 22 corresponds so as to be switched to the scattered air-blowing mode. When the push button 54 is pushed again, the latch mechanism 56 releases the push button, so that the first connection element 24 is returned to the original position by the urging force of the spring 40, and each fin is guided by the links 26, 28, 30, 32, and 34 wherein each pin 22 corresponds so as to be switched to the parallel air-blowing mode.

Also, in the Patent Document 1, in the aforementioned structure, there are disclosed two modified examples wherein the aforementioned link mechanism is modified. Among those, in the link mechanism disclosed in FIG. 3 and FIG. 4 in the Patent Document 1 (not shown in the drawings), the fins 12 and 14 on a lower side are turnably connected relative to the first connection element 24 through each arm pivotally supported by common pins 62; the fins 18 and 20 on an upper side are turnably connected relative to the first connection element 24 through each arm pivotally supported by the common pins 62; and the intermediate fin 16 is fitted into the slot-shaped link 30 provided in the first connection element 24 through the pin 22.

In the link mechanism disclosed in FIG. 5 and FIG. 6 in the Patent Document 1, the fins 12 and 14 on the lower side are turnably connected relative to the first connection element 24 through links 60 and 70; the fins 18 and 20 on the upper side are turnably connected relative to the first connection element 24 through the links 60 and 70; and the intermediate fin 16 having two structures is connected by the link, and fitted into the slot-shaped link 30 provided in the first connection element 24 through the pin 22.

PRIOR ART DOCUMENT

Patent Document

Patent Document 1: Japanese Unexamined Patent Application Publication No. 2002-277040

SUMMARY OF THE INVENTION

Problems to be Solved by the Invention

In the structure of the aforementioned Patent Document 1, each fin includes the relatively large first connection element which is connected through the link mechanism, and the first connection element is movably incorporated relative to the frame. Also, there are required the button and the operation element moving the first connection element forward against the urging force of the spring; and further the latch mechanism maintaining the state after the movement as well. As a result, the structure of the aforementioned Patent Document 1 becomes complicated so as to be difficult to obtain reduction in weight as well.

Also, the link mechanism has the structure of connecting the first connection element and each fin in any structure, and in a case of forming a plurality of slot-shaped links in the first connection element in FIG. 1 and FIG. 2 of the Patent Document 1, an excellent operation is difficult to be maintained, and in cases of the structure in FIG. 3 and FIG. 4 of the Patent Document 1, and the structure in FIG. 5 and FIG. 6 of the Patent Document 1, there are many dedicated links in addition to the first connection element so as to become complicated and increase weight as well.

An object of the present invention is to solve the aforementioned problems, and easily obtain a simplified structure and the reduction in weight as well as excellence in an airflow-direction adjustment. Other objects of the present invention will be clarified in the following explanation of contents.

Means for Solving the Problems

In order to obtain the aforementioned objects, the present invention according to the first viewpoint provides an airflow-direction adjustment device comprising a case set in such a way as to blow out air to an outside from a front-side opening portion; a plurality of fins disposed substantially in parallel relative to opposed support portions inside the case wherein one end side in a plate width direction located on right and left side faces is pivotally supported turnably; a link mechanism associating two or more of the fins; and a switch linked to the link mechanism so as to adjustably switch between a parallel air-blowing mode wherein the fins become approximately parallel to each other, and a scattered air-blowing mode wherein two or more of the fins are turned in a direction opposite to each other through the switch, wherein the switch is movably assembled to an intermediate fin disposed in a middle among the plurality of fins, and the link mechanism includes two first links, each turnably connecting at one end to one end side corresponding to other end side in the plate width direction of first fins, disposed on two adjacent sides of the intermediate fin, and turnably connecting at another end to the switch respectively.

Also, the present invention according to a second viewpoint provides the airflow-direction adjustment device comprising a case set in such a way as to blow out air to an outside from a front-side opening portion; a plurality of fins wherein upper and lower ends are pivotally supported turnably relative to opposed support portions inside the case; a link mechanism associating two or more of the fins; and an operating knob so as to adjustably switch between a parallel air-blowing mode wherein the fins become substantially parallel to each other, and a scattered air-blowing mode wherein two or more of the fins are turned in a direction opposite to each other through the knob, wherein the knob is supported movably to front and back and right and left in a state connected to an intermediate fin disposed in a middle among the plurality of fins, and the link mechanism includes two first links, each turnably connecting at one end to one first fin disposed adjacent to the intermediate fin, and turnably connecting at another end to the intermediate fin.

In the aforementioned structures, in the airflow-direction adjustment device according to the first viewpoint of the present invention, the "intermediate fin" represents the fin except for the uppermost and lowermost fins, for example, in a case of a four-piece-structure, the "intermediate fin" is used to represent the fin except for the uppermost and lowermost fins, i.e. a second or third fin from the bottom; in a case of a five-piece-structure, the "intermediate fin" is used to represent the fin except for the uppermost and lowermost fins, i.e. any of second to fourth fins from the bottom; and in a case of a six-piece-structure, the "intermediate fin" is used to represent the fin except for the uppermost and lowermost fins, i.e. any of second to fifth fins from the bottom. The intermediate fin can be formed with two pieces with reference to FIG. 5 and FIG. 6 of Patent Document 1 as well. Also, "one end side" or the "other end side" is not used with a meaning strictly representing one end or the other end, and is used with a meaning including a structure displaced to an intermediate side more than one end or the other end.

In the aforementioned present invention, it is more preferable to be embodied as specified in the following.

(1) In the airflow-direction adjustment device according to the first viewpoint of the present invention, a structure includes such that the aforementioned plurality of fins includes a second fin disposed on a side opposite to the aforementioned intermediate fin among both adjacent sides of the aforementioned first fin, and the aforementioned link mechanism includes two second links turnably connecting different end portions respectively to other end side in a plate width direction of the second fin and the other end side in the plate width direction of the first fin. According to the preferred aspect, the fins have at least five pieces as an embodiment, and in that case, two links may be further added so as to be carried out with a total of five members. Additionally, a member moving against an urging force of a spring inside a case such as the Patent Document 1, a latch mechanism, and the like become unnecessary so as to form a simplified structure and an excellent operation thereby, and easily obtain reduction in weight as well.

(2) In the airflow-direction adjustment device according to the first viewpoint of the present invention, the aforementioned switch is operated to be pushed to move backward which is the plate width direction of the intermediate fin to switch the first fin, or the first fin and the second fin from the parallel air-blowing mode to the scattered air-blowing mode through the aforementioned link mechanism. According to the preferred aspect, the switch is assembled movably to front and back in the plate width direction of the intermediate fin so as to easily make the switch itself compact, and furthermore, a switch disposing space can be kept to a minimum.

(3) In the preferred aspect of the aforementioned (2), in a state wherein the switch is moved backward as above, the switch is operated to be pulled to move forward which is the plate width direction of the intermediate fin, or the first fin or the second fin is directly turned so as to switch from the scattered air-blowing mode to the parallel air-blowing mode. According to the preferred aspect, in the state wherein the switch is pushed to be moved backward, i.e. in the scattered air-blowing mode of the first fin or the second fin, when the switch is operated to be pulled, or even when the first fin or the second fin is directly turned, the scattered air-blowing mode of the first fin or the second fin can be switched to the parallel air-blowing mode so as to excel in usability.

(4) In the preferred aspects of the aforementioned (1) to (3), the first fin and the second fin have shaft portions fitting into shaft holes provided in the first link or the second link, and the intermediate fin has notch portions movably disposing corresponding end portions of the first link in place of the aforementioned shaft portions. According to the preferred aspect, for example, the parallel air-blowing mode is set with a state wherein a connection portion between the other end of the first link and the switch is disposed in the notch portion of the intermediate fin, so that a connection-portion disposing space can be kept to minimum.

(5) In the airflow-direction adjustment device according to the second viewpoint of the present invention, the aforementioned plurality of fins includes a second fin disposed on a side opposite to the intermediate fin among both adjacent sides of the first fin; and a third fin disposed on a side opposite to the first fin among both adjacent sides of the second fin, and the aforementioned link mechanism includes two second links turnably connecting the first fin, the second fin, and the third fin respectively. According to the preferred aspect, in a case wherein the fins have seven pieces, two links may be added further so as to be carried out with a total of five members. Additionally, the member moving against the urging force of the spring inside the case such as the Patent Document 1, the latch mechanism, and the like become unnecessary so as to form the simplified structure and the excellent operation thereby, and easily obtain the reduction in weight as well.

(6) In the preferred aspect of the aforementioned (5), a structure includes a horizontal-type fin wherein both right and left end sides are pivotally supported turnably relative to an opposed second support portion inside the case, and the knob is supported movably to the front and back, right and left relative to the horizontal-type fin. Also, the knob is operated to move forward to switch the first fin, or the first fin and the second fin, or the first fin to the third fin from the parallel air-blowing mode to the scattered air-blowing mode through the link mechanism. According to the preferred aspect, the knob is supported movably to the front and back and the right and left relative to the horizontal-type fin, so that a support structure of the knob can be simplified, and only by turnably supporting the horizontal-type fin, an air-blowing aspect can be modified furthermore according to a position of the horizontal-type fin.

(7) In the preferred aspect of the aforementioned (5) or (6), in a state moved forward as above, the aforementioned knob is operated to be pushed backward so as to switch the first fin, or the first fin and the second fin, or the first fin to the third fin from the scattered air-blowing mode to the parallel air-blowing mode which becomes approximately parallel to the aforementioned support portion through the link mechanism, and in that state thereof, the knob is operated to move to a left or right side so as to turn each fin in an approximately same direction to switch to an inclined air-blowing mode which becomes non-parallel to the support portion. According to the preferred aspect, the parallel air-blowing mode and the scattered air-blowing mode can be switched by operating the knob to move forward and backward, and the parallel air-blowing mode and the inclined air-blowing mode can be switched by operating the knob to move horizontally so as to provide various air-blowing modes with fewer parts.

Effect of the Invention

In the airflow-direction adjustment device according to the first viewpoint of the present invention, the structure comprising the link mechanism associating two or more fins among the plurality of fins; and the switch linked to the link mechanism so as to adjustably switch between the parallel air-blowing mode wherein the fins become approximately parallel to each other, and the scattered air-blowing mode wherein the two or more fins are turned in the directions opposite to each other, can be carried out by the structure of movably assembling the switch to the intermediate fin; and the structure of two first links turnably connecting respectively one end side corresponding to the first fins disposed on both adjacent sides of the intermediate fin, and turnably connecting respectively the corresponding other end side to the switch as the link mechanism. On the other hand, in the airflow-direction adjustment device according to the second viewpoint of the present invention, the structure comprising the link mechanism associating two or more fins among the plurality of fins; and the operating knob so as to adjustably switch between the parallel air-blowing mode wherein the fins become approximately parallel to each other, and the scattered air-blowing mode wherein the two or more fins are turned in the directions opposite to each other, can be carried out by the structure of connecting the knob to the intermediate fin; and the structure of two first links turnably connecting respectively one end side corresponding to the first fins disposed on both adjacent sides of the intermediate fin, and turnably connecting respectively the corresponding other end side to the intermediate fin as the link mechanism.

Namely, in the airflow-direction adjustment device according to the first viewpoint of the present invention, for example, in a case wherein the fins have three pieces, the two links forming the link mechanism can be turnably connected to the single switch so as to be carried out with a total of three members. On the other hand, in the airflow-direction adjustment device according to the second viewpoint of the present invention, for example, in a case wherein the fins have three pieces, the single knob connected to the intermediate fin, the intermediate fin, and the fins on both adjacent sides of the intermediate fin can be connected by the two links forming the link mechanism so as to be carried out with a total of three members.

BRIEF DESCRIPTION OF THE DRAWINGS

FIGS. 1(a) and 1(b) schematically show an airflow-direction adjustment device according to the first embodiment of the present invention, wherein FIG. 1(a) is an external view in a parallel air-blowing mode state; and FIG. 1(b) is an external view in a scattered air-blowing mode state.

FIGS. 2(a) and 2(b) show details of the airflow-direction adjustment device in the aforementioned parallel air-blowing mode state, wherein FIG. 2(a) is a top view; and FIG. 2(b) is a front view.

FIGS. 3(a) and 3(b) show details of the airflow-direction adjustment device in the aforementioned scattered air-blowing mode state, wherein FIG. 3(a) is a top view; and FIG. 3(b) is a front view.

FIGS. 9(a), 9(b), 9(c), and 9(d) show each link forming the aforementioned airflow-direction adjustment device, wherein FIG. 9(a) is a front view in a state of FIG. 5(c); FIGS. 9(b) and 9(c) are a front view and a side view wherein the switch is connected in the same state; and FIG. 9(d) is a schematic cross-sectional view taken along a line D-D in FIG. 9(c).

FIG. 11 is a schematic exploded perspective view showing a relationship between main members forming the airflow-direction adjustment device in FIG. 10.

FIGS. 12(a) to 12(d) show the airflow-direction adjustment device in FIG. 10 in the parallel air-blowing mode state, wherein FIG. 12(a) is a front view; FIG. 12(b) is a schematic cross-sectional view taken along a line A-A in FIG. 12(a); and FIGS. 12(c) and 12(d) are a schematic cross-sectional view taken along a line B-B in FIG. 12(*a*), and a schematic cross-sectional view taken along a line C-C in FIG. 12(*a*).

FIG. 13(*b*) is a schematic cross-sectional view taken along a line A-A in FIG. 13(*a*); and FIGS. 13(*c*) and 13(*d*) are a schematic cross-sectional view taken along a line B-B in FIG. 13(*a*), and a schematic cross-sectional view taken along a line C-C in FIG. 13(*a*).

FIG. 14(*b*) is a schematic cross-sectional view taken along a line A-A in FIG. 14(*a*); and FIGS. 14(*c*) and 14(*d*) are a schematic cross-sectional view taken along a line B-B in FIG. 14(*a*), and a schematic cross-sectional view taken along a line C-C in FIG. 14(*a*).

FIGS. 15(*b*) and 15(*c*) are schematic cross-sectional views showing states wherein a horizontal-type fin is turned in different directions through a knob from a state in FIG. 15(*a*).

BEST MODES OF CARRYING OUT THE INVENTION

Figure 1A:
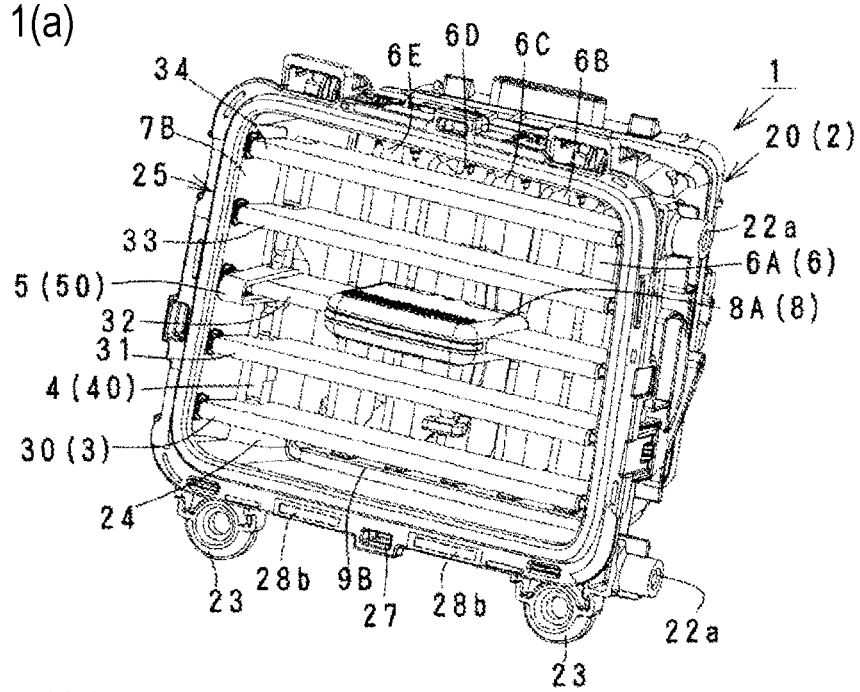

Hereinafter, the first embodiment and a second embodiment of the present invention will be explained with reference to the attached drawings. In the explanation, after a structure including an assembly of an airflow-direction adjustment device is clarified, main operations will be described. Incidentally, in the drawings, structures except for essential parts of the present invention will be omitted or simplified.

Figure 1B:
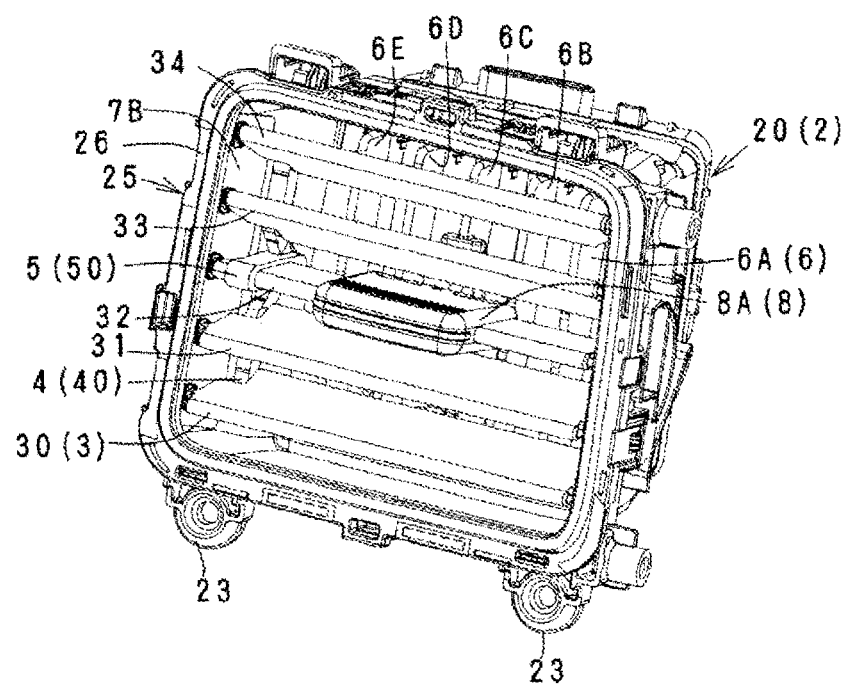
Figure 2A:
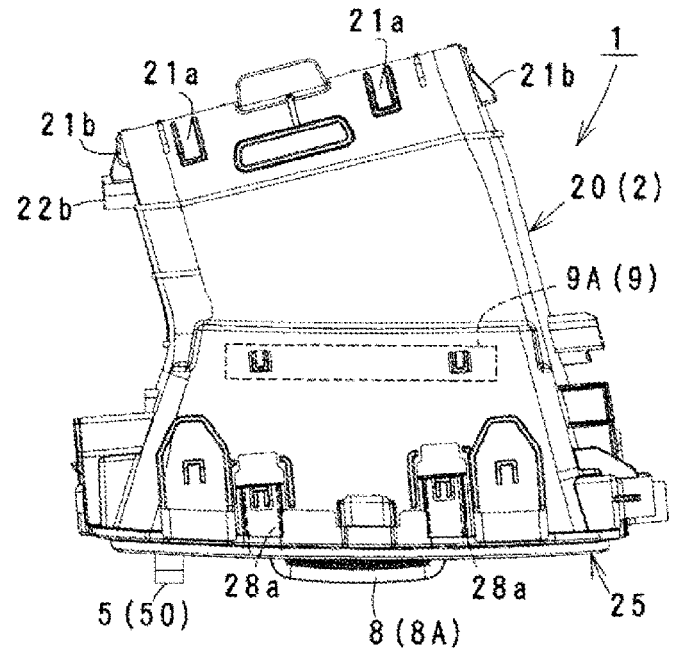
Figure 2B:
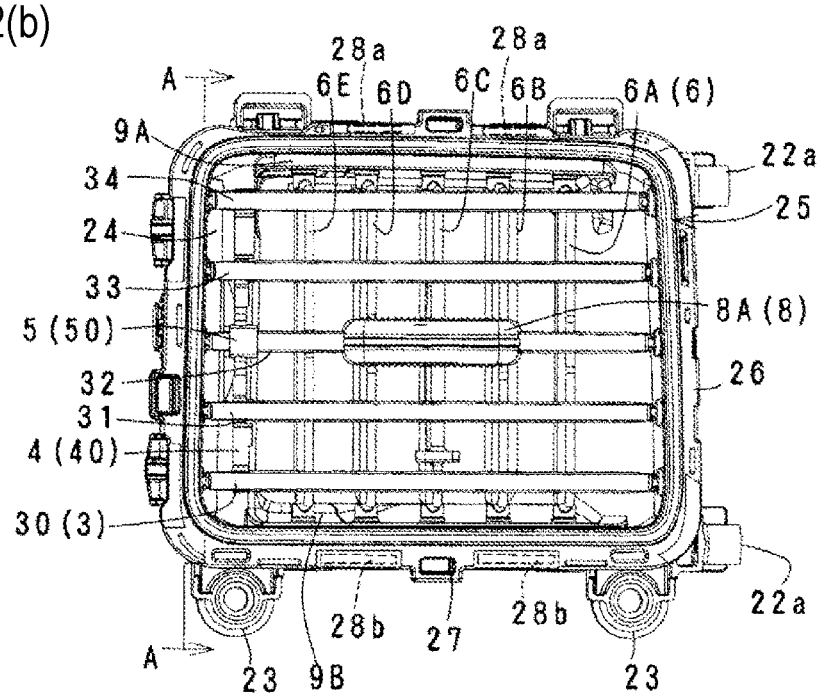
Figure 3A:
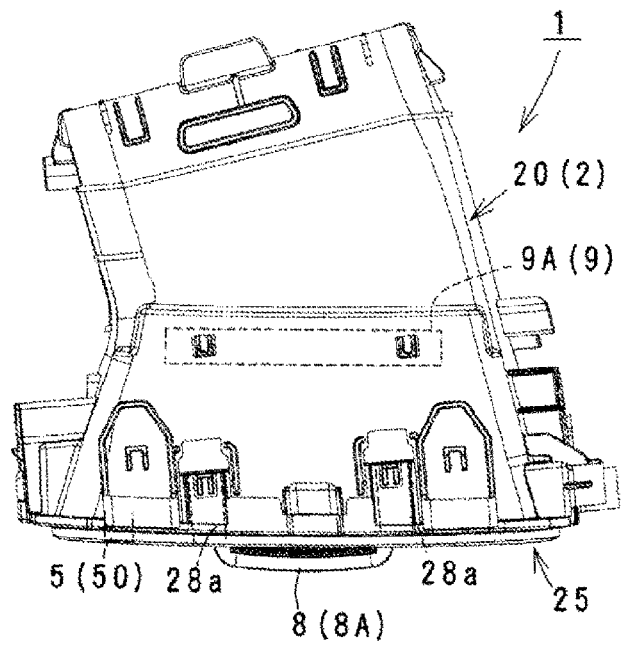
Figure 3B:
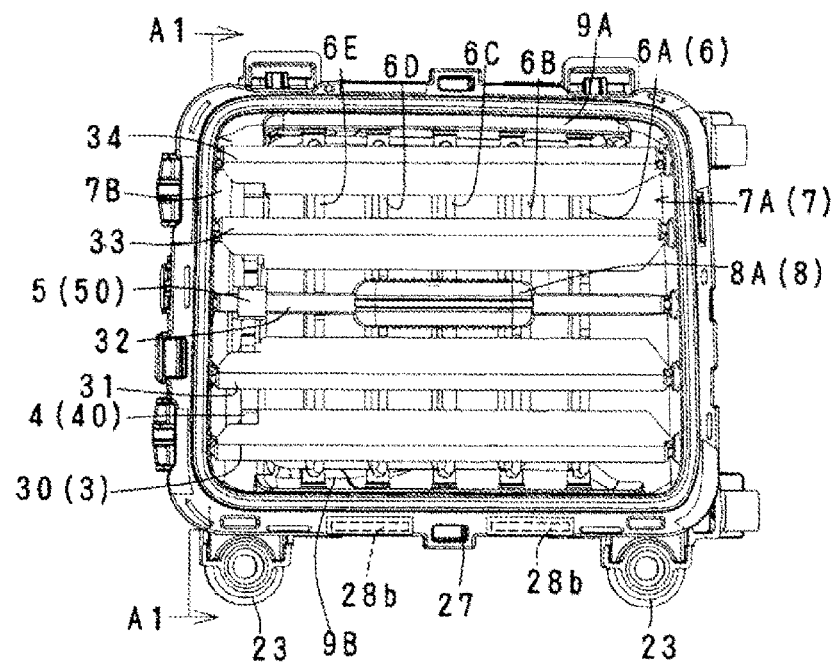

(First Structure) As shown in FIG. 1(*a*) to FIG. 3(*b*), an airflow-direction adjustment device 1 of the first embodiment comprises a case 2 set in such a way as to blow out air to an outside from an inside; a plurality (in the embodiment, five pieces) of horizontal-type fins 30 to 34 (3) disposed approximately in parallel relative to bearing brackets 7A and 7B (7) facing on right and left near a front-side opening inside the case 2, and located on right and left side faces 30*a* to 34*a* and 30*b* to 34*b* (see FIG. 8) wherein one end side in a plate width direction is pivotally supported turnably; a link mechanism 4 associating two or more fins; a switch 5 linked to the link mechanism 4; a plurality (in the embodiment, five pieces) of vertical-type fins 6A to 6E (6) disposed approximately in parallel relative to bearing brackets 9A and 9B (9) facing on top and bottom on a deep side of the front-side opening inside the case 2, and located on top and bottom side faces wherein an approximately middle is pivotally supported turnably; a connection member 9C (see FIG. 4) associating the fins 6A to 6E; and an operating operation member 8.

Then, as for operation characteristics, the vertical-type fins 6 can adjustably switch an airflow direction by turning each fin 6A to 6E to right and left only at a predetermined angle through the operation member 8. The horizontal-type fin 3 can adjustably switch between a parallel air-blowing mode wherein each fin 30 to 34 becomes approximately parallel to each other; and a scattered air-blowing mode wherein two or more fins (in the embodiment, the fins 31 and 33 which are first fins, and the fins 30 and 34 which are second fins, and in an embodiment wherein the fins 3 have a three-piece structure, the fins 31 and 33 which are the first fins) are turned in directions opposite to each other, through the switch 5.

In the aforementioned airflow-direction adjustment device 1, in the essential parts, the switch 5 is assembled movably to the intermediate fin 32 disposed in a middle among the plurality of fins 3; the link mechanism 4 includes two first links 41 and 42 turnably connecting respectively one end 42*a* and 41*a* sides (see FIG. 9(*b*)) corresponding to the other end sides in a plate width direction of the first fins 31 and 33 disposed on both adjacent sides of the intermediate fin 32, and turnably connecting respectively the corresponding other end 42*b* and 41*b* sides (see FIG. 9(*a*)) to the switch 5; and furthermore, the link mechanism 4 includes two second links 40 and 43 for associating or synchronizing the second fins 30 and 34 disposed on sides opposite to the intermediate fin 32 among both adjacent sides of the first fins 31 and 33, and the fin 30 with the first fin 31, and the fin 34 with the first fin 33 as the plurality of fins 3. In the following explanation, structures except for the essential parts can be modified so as to be described briefly.

Incidentally, a main member 20 and a front frame 25 forming the case 2; each fin 30 to 34 forming the horizontal-type fin 3; each link 40 to 44 forming the link mechanism 4; the operating switch 5; each fin 6A to 6E forming the vertical-type fins 6; a knob 8A and a base 8B forming the operation member 8; the brackets 7 and 9 or each bracket 7A, 7B, 9A, and 9B; and the connection member 9C, are all resin articles; however, they may be made of materials other than resin.

As shown in FIG. 1(*a*) to FIG. 3(*b*), and FIGS. 5(*a*) to 5(*c*), the case 2 is formed to divide an inner space 24 in a state wherein the front frame 25 which is a decorative frame is mounted on a front side of the main member 20. The main member 20 includes engagement portions 21*a* and 21*b* provided on a back portion side; positioning portions 22*a* and 22*b* provided on front and back portions; attachment portions 23; and the like, which are located on an outer face, to be mounted on an installation portion of a vehicle and the like using those portions. The inner space 24 opens in a front-and-back direction, and a front frame 25 side is set as an air outlet, and a back end side is set as an air inlet. The front frame 25 includes a flange portion 26 integrated around a frame, and is mounted on the main member 20 through an engagement hole 27, engagement piece portions 28*a* and 28*b*, and the like provided on the flange portion 26.

Figure 4:
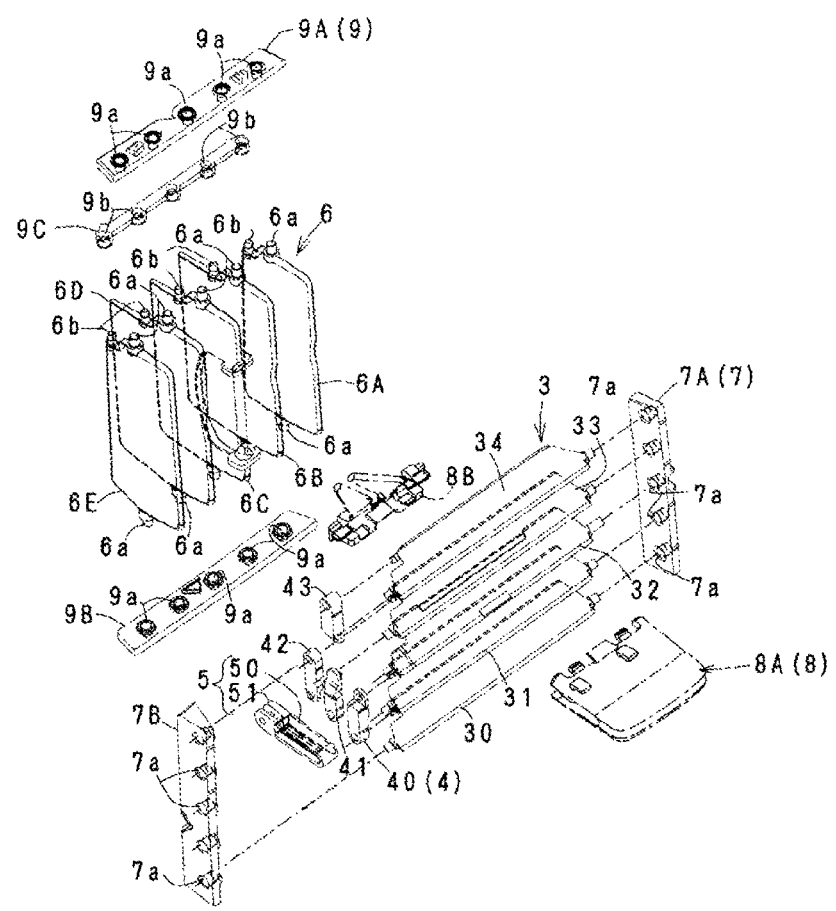
FIG. 4 is a schematic exploded perspective view showing a relationship between members forming a drive portion of the aforementioned airflow-direction adjustment device.

Inside the inner space 24, the brackets 9A and 9B for the vertical-type fins are mounted on an inner face of the top and bottom of the main member; and the brackets 7A and 7B for the horizontal-type fin are mounted on an inside face of the right and left of the main member. As shown in FIG. 4, the brackets 9A and 9B have five shaft holes 9*a* facing each other. The fins 6A to 6E include shaft portions 6*a* respectively protruding on upper and lower end portions, and are turnably supported in a state wherein each shaft portion 6*a* thereof is fitted into the corresponding shaft hole 9*a* relative to the brackets 9A and 9B. Also, each fin 6A to 6E includes shaft portions 6*b* provided in a step portion on an upper end side, and disposed on one step lower side than the shaft portions 6*a*, and the shaft portions 6*b* are turnably fitted respectively into corresponding shaft holes 9*b* provided in the arm-shaped connection member 9C. Consequently, in each fin 6A to 6E, in a state assembled to the operation member 8, i.e. the base 8B mounted on the intermediate fin 6C, and the later-described intermediate fin 32 slidably to the right and left, when the fins 6A to 6E are moved to the right and left through the knob 8A connected to the base 8B, all fins 6A to 6E are integrally associated through the connection member 9C.

Figure 7:
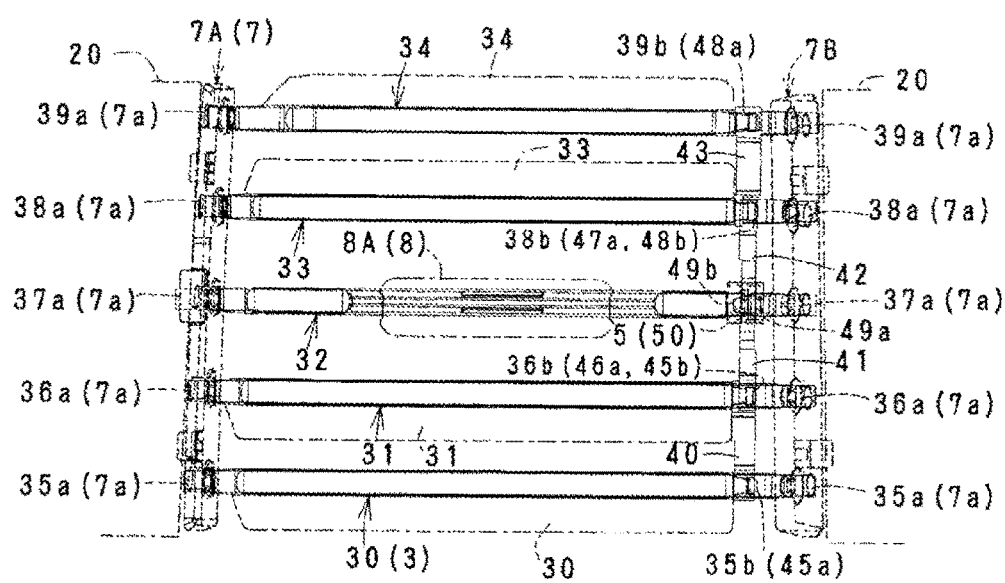
FIG. 7 is a pattern diagram wherein the airflow-direction adjustment device is viewed from an arrow C direction in FIG. 5(b) (or wherein fins 30, 31, 33, and 34 shown by dashed-dotted lines are viewed from an arrow C1 direction in FIG. 6(b)).
Figure 8:
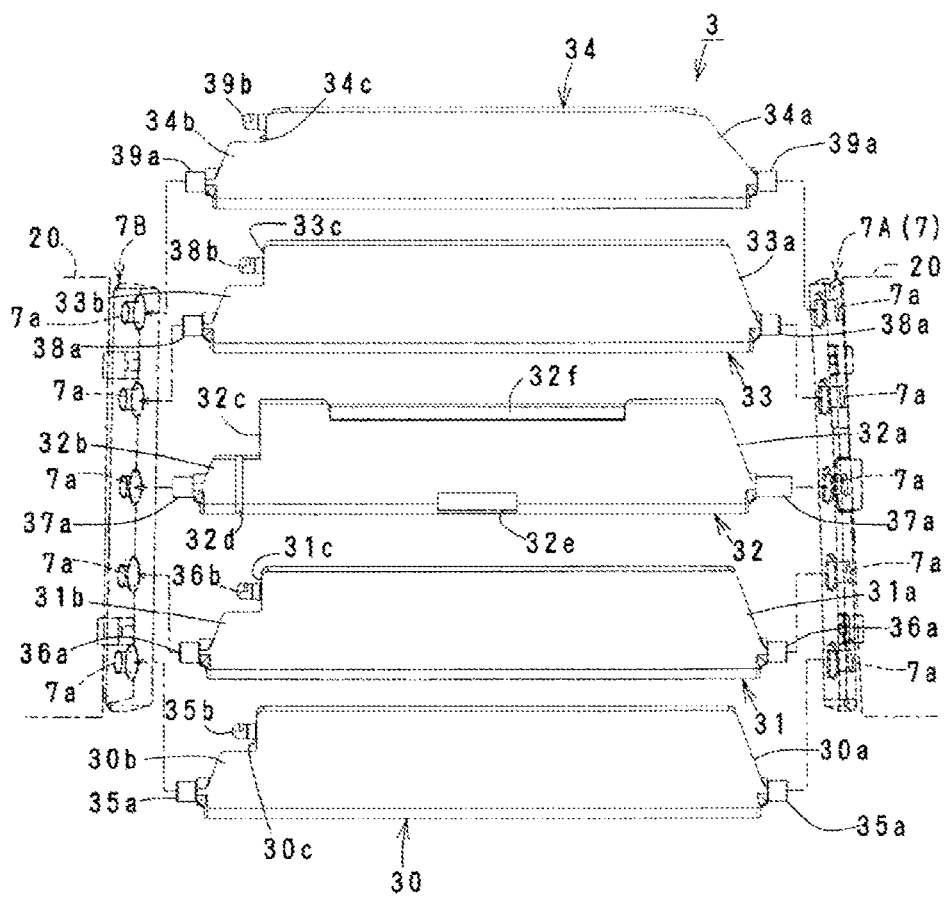
FIG. 8 is a drawing showing a shape of each fin and the like forming the aforementioned airflow-direction adjustment device.

On the other hand, as shown in FIG. 4, FIG. 7, and FIG. 8, the brackets 7A and 7B have five shaft holes 7a facing each other. The fins 30 to 34 include shaft portions 35a to 39a respectively protruding on each side face of the right end portions 30a to 34a and the left end portions 30b to 34b, and in a state wherein each shaft portion 35a to 39a is fitted into the corresponding shaft hole 7a relative to the brackets 7A and 7B, the fins 30 to 34 are disposed approximately in parallel between the same brackets, and turnably supported.

Also, each fin 30 to 34 includes notch portions 30c to 34c provided in the left end portions 30b to 34b. Among the notch portions 30c to 34c, in the notch portions 30c and 31c, and the notch portions 33c and 34c, there are provided shaft portions 35b and 36b, and shaft portions 38b and 39b which are approximately in parallel to the shaft portions 35a and 36a, and the shaft portions 38a and 39a, and slightly smaller. On the other hand, the notch portion 32c of the intermediate fin 32 is formed larger compared to the notch portions 30c, 31c, 33c, and 34c, and is not provided with a shaft portion corresponding to the shaft portions 35b, 36b, 38b, and 39b. Namely, the notch portion 32c is used as a portion to movably dispose the end portions 41b and 42b corresponding to the later-described first links 41 and 42 (and the connection portion 51 of the switch 5 connecting to the end portions 41b and 42b).

Moreover, as shown in FIG. 8, the intermediate fin 32 includes a concave portion 32d located at the left end portion 32b and provided at a periphery portion corresponding to the notch portion 32c; and a guide groove 32e located in a middle portion of right and left and provided at one side close to a line connecting the shaft portions 37a on both sides; and a guide groove 32f provided on the other side and facing the guide groove 32e. Among those, the concave portion 32d forms a guide device by fitting into convex portions 56 (see FIG. 9(d)) on a switch 5 side when the later-described switch 5 slides in a front-and-back direction. The guide grooves 32e and 32f are used for assembling the knob 8A in FIG. 4 slidably in a right-and-left direction only for a predetermined distance. The knob 8A is connected to the aforementioned base 8B in a state assembled to the intermediate fin 32 through the guide grooves 32e and 32f.

As shown in FIGS. 5(a) to 5(c), and FIGS. 9(a) to 9(d), the aforementioned link mechanism 4 includes a total of four links of the first links 41 and 42, and the second links 40 and 43. However, as for the link mechanism 4, with respect to the embodiment, if a device structure has three fins 31 to 33, the second links 40 and 43 are to be omitted, and contrarily, if the device structure has seven fins, two more links are to be added.

In FIGS. 9(a) to 9(d), the lowermost link 40 is the first link, and includes a shaft hole 45a provided in one end portion 40a, and a shaft hole 45b provided in a step portion of the other end portion 40b. The link 41 is the second link, and includes a shaft hole 46a provided in one end portion 41a and communicated with the shaft hole 45b; and a shaft portion 49b provided in a step portion of the other end portion 41b. The link 42 is the third link, and includes a shaft hole 47a provided in one end portion 42a; and a shaft portion 49a provided in a step portion of the other end portion 42b, and disposed back to back with the shaft portion 49b. The uppermost link 43 is the fourth link, and includes a shaft hole 48a provided in one end portion 43a; and a shaft hole 48b provided in a step portion of the other end portion 41b, and communicated with the shaft hole 47a.

Then, in a case of the aforementioned three fins 31 to 33 of the device structure, in the first links 41 and 42, in a state wherein the shaft portion 36b of the fin 31 forming the first fin is turnably fitted into the shaft hole 46a, and the shaft portion 38b of the fin 33 forming the first fin is turnably fitted into the shaft hole 47a, the respective other end portions 41b and 42b are turnably connected to the connection portion 51 of the later-described switch 5. Thereby, the fins 31 and 33 can adjustably switch between the parallel air-blowing mode disposed approximately in parallel to the intermediate fin 32; and the scattered air-blowing mode turned in the opposite directions through the switch 5.

In a case of the five fins 30 to 34 of the device structure as shown in the embodiment, in addition to the above, the shaft portion 36b of the fin 31 forming the first fin is turnably fitted into the shaft holes 45a and 46a; the shaft portion 38b of the fin 33 forming the first fin is turnably fitted into the shaft holes 48b and 47a; furthermore, the shaft portion 35b of the fin 30 forming the second fin is turnably fitted into the shaft hole 45a; and the shaft portion 39b of the fin 34 forming the second fin is turnably fitted into the shaft hole 48a. Thereby, the fins 30 and 31, and the fins 33 and 34 can adjustably switch between the parallel air-blowing mode disposed approximately in parallel to the intermediate fin 32; and the scattered air-blowing mode turned in the opposite directions through the switch 5.

As shown in FIG. 4, FIGS. 5(a) to 5(c), and FIGS. 9(a) to 9(d), the aforementioned switch 5 has an approximately U shape, and is formed by a main member 50 internally disposing the left end portion 32b of the intermediate fin 32; and the connection portion 51 integrated with a front side of the main member 50. Among those, the main member 50 includes the convex portions 56 respectively provided on facing inner faces of the U shape, and fitting into the concave portion 32d of the intermediate fin 32. The convex portions 56 form the guide device for moving the switch 5 to front and back together with the concave portion 32d.

Figure 9A:
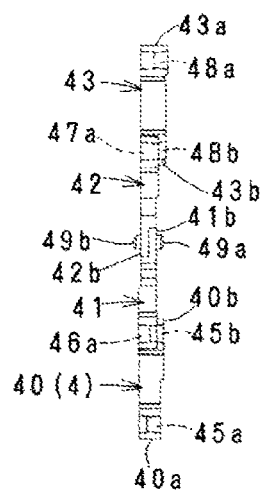
Figure 9B:
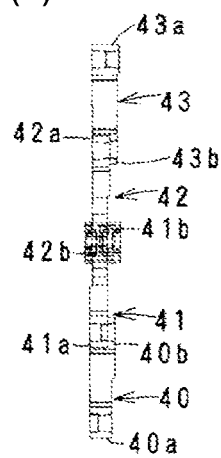
Figure 9C:
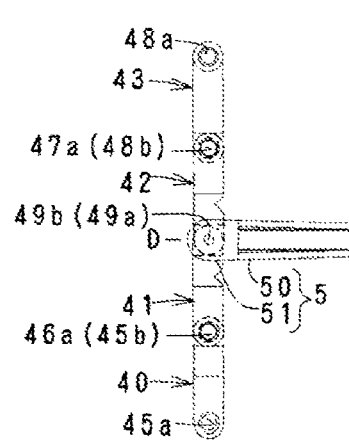
Figure 9D:
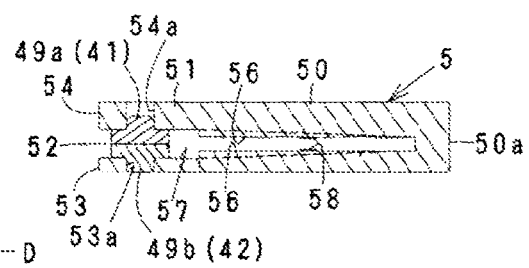
Figure 10:
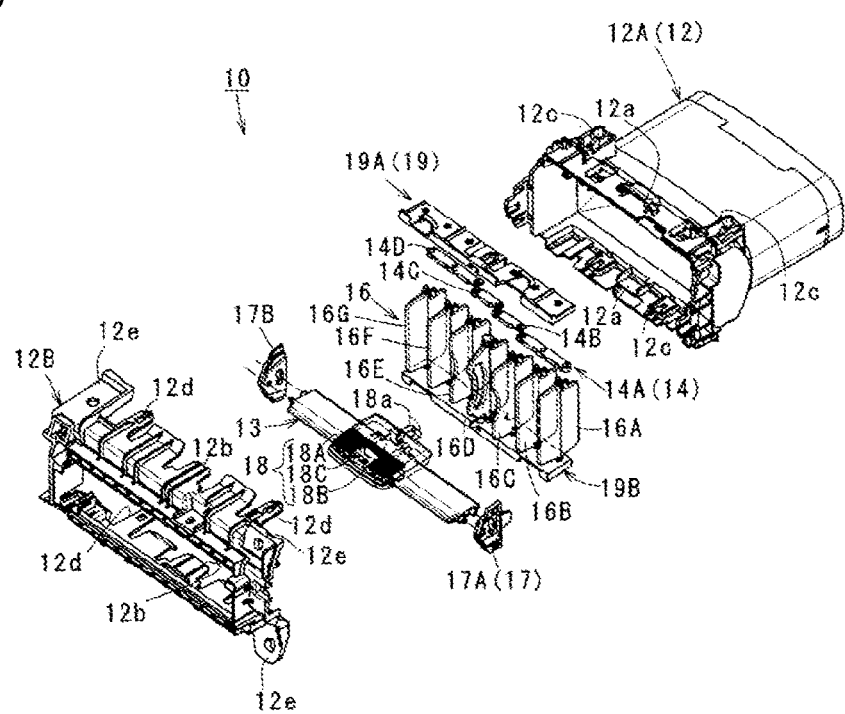
FIG. 10 is a schematic exploded perspective view wherein the airflow-direction adjustment device according to a second embodiment of the present invention is exploded.

As shown in FIG. 9(d), the connection portion 51 forms link clamping piece portions 53 and 54 divided into two through a vertical groove 52 in a middle of the right and left. In each clamping piece portion 53 and 54, there are provided horizontal shaft holes 53a and 54a on the same shaft line. Then, in the aforementioned shaft holes 53a and 54a, there are fitted the shaft portions 49a and 49b corresponding to the aforementioned links 41 and 42 in a state wherein the respective other ends 41b and 42b are superimposed. Thereby, in the structure, the first fins 31 and 33 can switch between the parallel air-blowing mode in FIGS. 5(a) to 5(c), and the scattered air-blowing mode in FIGS. 6(a) to 6(c) by the first links 41 and 42 (the second link 41 and the third link 42) connected respectively through the switch 5.

(Operations) Hereinafter, the main operations of the air-flow-direction adjustment device 1 made as mentioned above will be described.

(1) FIG. 1(a), FIGS. 2(a) and 2(b), and FIGS. 5(a) to 5(c) show a state of the parallel air-blowing mode wherein each fin 30 to 34 becomes approximately parallel to each other. In this state, each link 40 to 43 is linearly disposed, and the switch is moved in a direction of projecting outwardly. In the structure, in the parallel air-blowing mode, the switch 5 is set smaller than a projecting quantity of the knob 8A in consideration of safety.

Figure 5A:
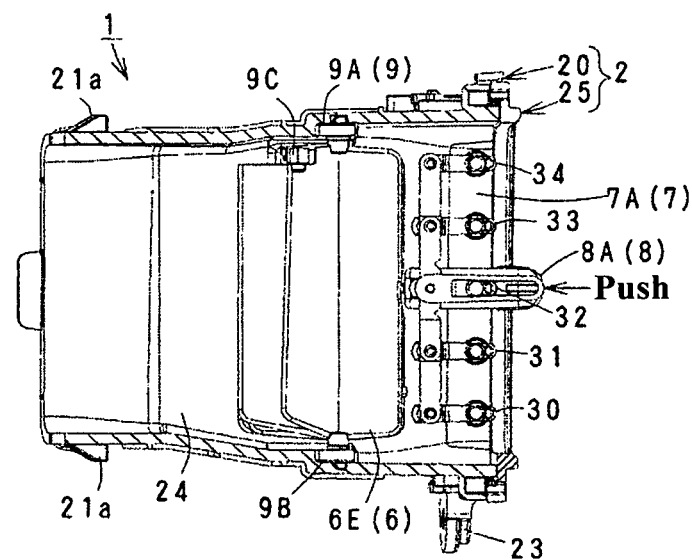
FIG. 5(a) is a schematic cross-sectional view taken along a line A-A in FIG. 2(b)

(2) FIG. 1(b), FIGS. 3(a) and 3(b), and FIGS. 6(a) to 6(c) show a state of the scattered air-blowing mode wherein the switch 5 is pushed to maximum in an arrow direction in FIG. 5(a) from the state of the parallel air-blowing mode so that the fins 30 and 31, and the fins 33 and 34 are turned in the opposite directions. In this state, first, the shaft holes 54a and 53a and the shaft portions 49a and 49b are fitted, so that the first links 41 and 42 operated to be connected to the switch 5 are horizontally moved in an arrow direction shown in the middle in FIG. 6(c), i.e. backward, and the second links 40 and 43 operated to be connected to the link 41 or 42 are vertically moved in arrow directions shown on the top and bottom in the same drawing. Obviously, turning angles of the fins 30 and 31, or the fins 33 and 34 become angles in proportion to a moving quantity of the switch 5 so as to obtain various scattered air-blowing aspects.

(3) In a case of returning to the parallel air-blowing mode from the scattered air-blowing mode again, the switch 5 is pinched to pull, i.e. to move forward which is a plate width direction of the intermediate fin 32 so as to return to the parallel air-blowing mode again. In another method, one of the fins 30 and 31, and the fins 33 and 34 is pinched to directly turn the fin thereof so as to switch from the scattered air-blowing mode to the parallel air-blowing mode as well. Consequently, the aforementioned structure excels in usability as well.

Figure 5B:
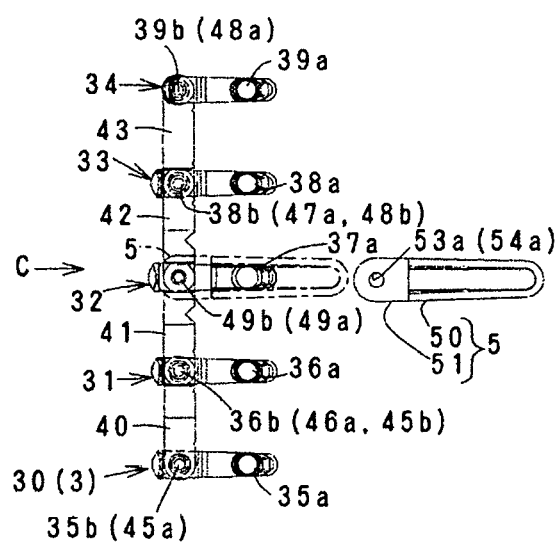
FIG. 5(b) is an enlarged view of essential parts showing a relationship between fins, a link mechanism, and a switch in FIG. 5(a)
Figure 5C:
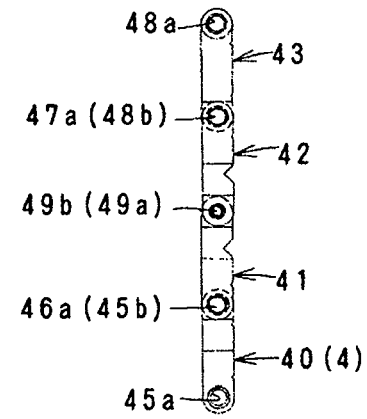
FIG. 5(c) is a side view showing four links forming the link mechanism thereof.
Figure 6A:
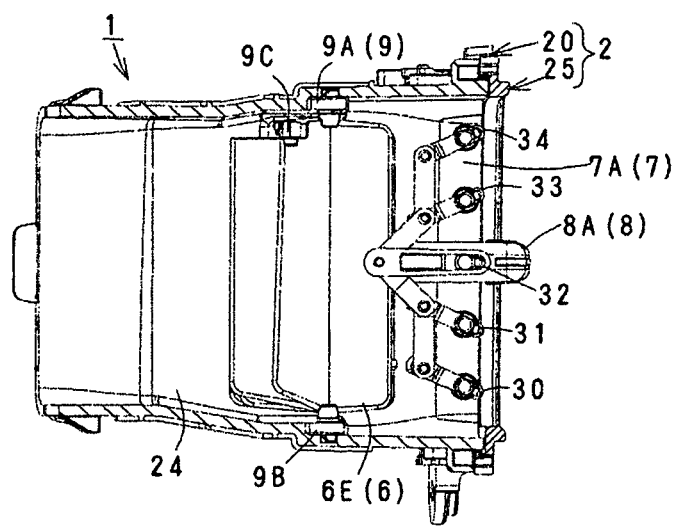
FIG. 6(a) is a schematic cross-sectional view taken along a line A1-A1 in FIG. 3(b)
Figure 6B:
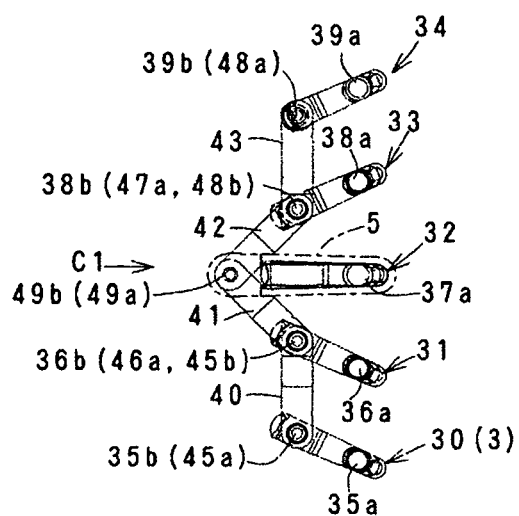
FIG. 6(b) is an enlarged view of essential parts showing a relationship between the fins, the link mechanism, and the switch in FIG. 6(a)
Figure 6C:
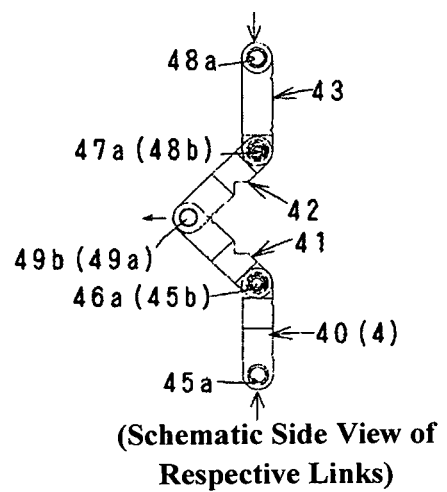
FIG. 6(c) is a side view showing the four links forming the link mechanism.

(4) In the embodiment, as shown in FIG. 9(d), a shape of the convex portion 56 of the aforementioned switch is formed to gradually become lower toward a back end portion 50a from a connection portion 51 side, or there is formed a small convex portion 58 in a middle in a longitudinal direction of the convex portion 56 so as to be designed to prevent the switch 5 from rattling relative to the intermediate fin 32 at an initial position in FIGS. 5(a) to 5(c), and a push-in position after a movement in FIGS. 6(a) to 6(c). However, the above-mentioned portions can be omitted or modified.

(5) In the embodiment, the switch 5 is assembled to be movable to front and back in the plate width direction of the intermediate fin 32, so that the switch itself can be easily made flat and compact, and a space disposing the switch 5 can be kept to minimum. Moreover, the embodiment excels in that a simplified guide device such as the concave and convex 32d and 56, and the like can be easily added between the aforementioned switch 5 and intermediate fin 32.

(6) In the embodiment, the intermediate fin 32 includes the comparatively large notch portion 32c movably disposing both corresponding end portions 41b and 42b of the first links 41 and 42, so that a space for disposing the connection portion can be kept to minimum, for example, by making the parallel air-blowing mode in a state in FIG. 5(b) wherein the connection portion 51 between the other ends 41b and 42b of the first links 41 and 42, and the switch 5 is disposed in the notch portion 32c thereof.

(Second Structure) As shown in FIG. 10 to FIG. 15(c), an airflow-direction adjustment device 10 of the second embodiment comprises a case 12 set in such a way as to blow out air to an outside from an inside; a horizontal-type fin 13 pivotally supported turnably relative to bearing brackets 17A and 17B (17) facing on right and left near a front opening inside the case 12; a plurality (in the embodiment, seven pieces) of vertical-type fins 16A to 16G (16) wherein top and bottom ends are pivotally supported turnably relative to bearing brackets 19A and 19B (19) facing on top and bottom on a deep side of the front opening inside the case 12; a link mechanism 14 associating two or more fins among each fin 16; and an operating knob 18.

Figure 15A:
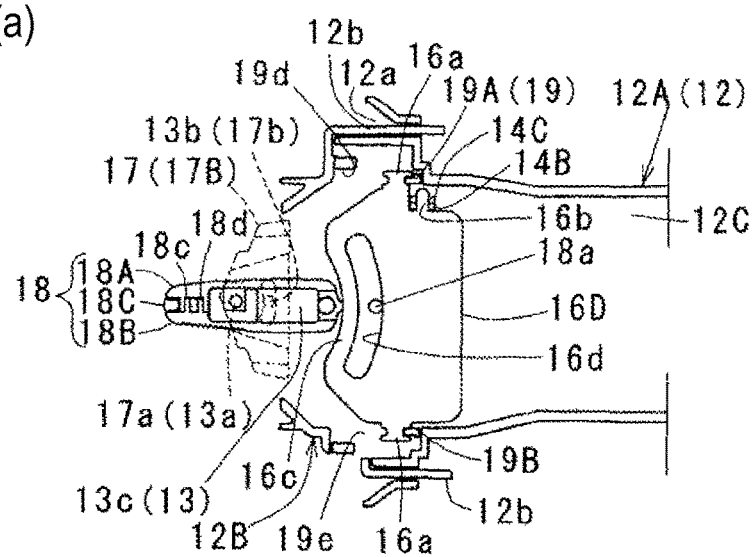
FIG. 15(*a*) is an enlarged view of FIG. 13(*b*)
Figure 15B:
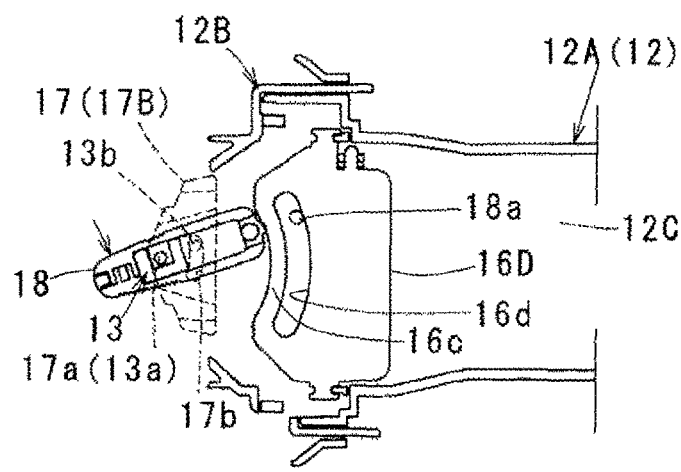
Figure 15C:
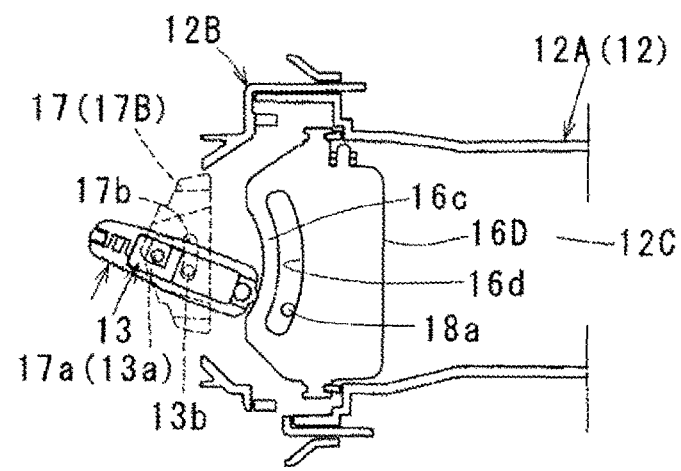
Figure 16A:
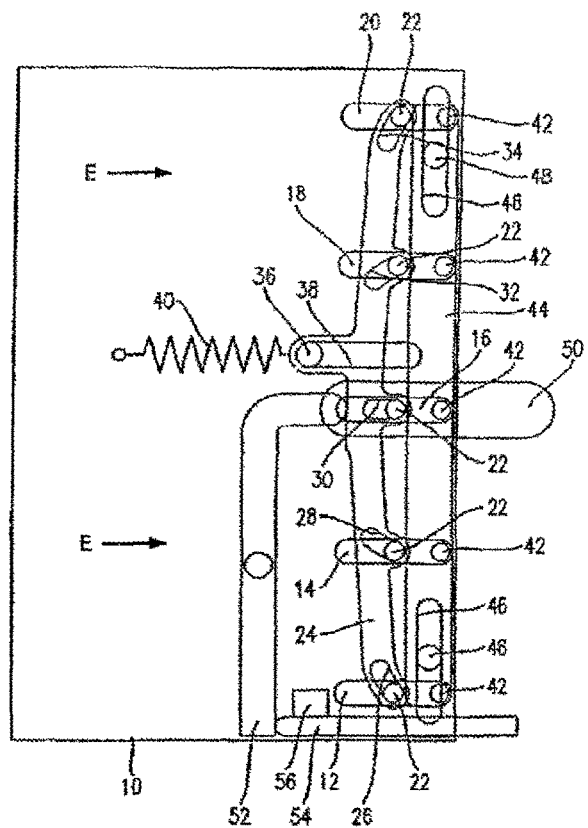
FIGS. 16(*a*) and 16(*b*) are drawings showing a structure disclosed in FIG. 1 and FIG. 2 of Patent Document 1.
Figure 16B:
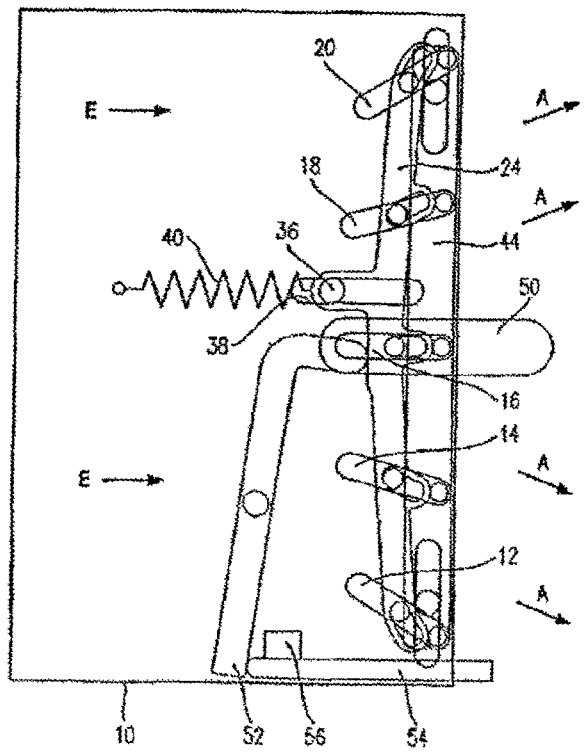

Then, as for operation characteristics, as shown in FIGS. 15(a) to 15(c), the horizontal-type fin 13 can adjustably switch an airflow direction by turning a back side up and down only at a predetermined angle as a supporting point on a front side of a plate width. The vertical-type fins 16A to 16G (16) can adjustably switch between the parallel air-blowing mode (see FIGS. 12(a) to 12(d)) which becomes approximately parallel to each other; and the scattered air-blowing mode (see FIGS. 13(a) to 13(d)) wherein two or more fins (in the embodiment, the fins 16C and 16E which are first fins; the fins 16B and 16F which are second fins; and the fins 16A and 16G which are third fins, and as for a modified embodiment, in an embodiment wherein the fins 16 have five pieces, the fins 16A and 16G which are the third fins are to be omitted) are turned in directions opposite to each other, through the knob 18. Additionally, in the state of the parallel air-blowing mode, the knob 18 is turned in the same direction by operating to move horizontally, i.e. to a left or right side, so that each vertical-type fin 16A to 16G is switched to an inclined air-blowing mode which becomes non-parallel to the brackets 17A and 17B which are support portions.

In the aforementioned airflow-direction adjustment device 10, regarding the essential parts, the knob 18 is supported in the horizontal-type fin 13, and movable to front and back, and right and left in a state connected to the intermediate fin 16D among the vertical-type fins 16. Also, the link mechanism 14 includes two first links 14B and 14C turnably connecting respectively the intermediate fin 16D, and the first fins 16C and 16E disposed on both adjacent sides of the intermediate fin 16D; and furthermore, two second links 14A and 14D for associating or synchronizing the second fins 16B and 16F disposed on sides opposite to the intermediate fin 16D among both adjacent sides of the first fins 16C and 16E, the third fins 16A and 16G disposed outside the second fins 16B and 16F as for the plurality of fins 16, the second fins 16B and 16F, and the third fins 16A and 16G with the first fins 16C and 16E. In the following explanation as well, structures except for the essential parts can be modified so as to be described briefly.

Incidentally, a main member 12A and a front frame 12B forming the case 12; the horizontal-type fin 13; each fin 16A to 16G forming the vertical-type fins 16; each link 14A to 14D forming the link mechanism 14; an upper knob 18A and a lower knob 18B forming the knob 18; the right and left brackets 17A and 17B (17) which are the support portions; and the top and bottom brackets 19A and 19B (19) which are second support portions, are all resin articles; however, they may be made of materials other than resin.

The case 12 is formed to divide an inner space 12C by the main member 12A having an approximately cylinder shape, and the front frame 12B which is the decorative frame mounted on a front side of the main member 12A. The main member 12A and the front frame 12B are positioned by engaging a piece portion 12b on a front frame side with a receiving portion 12a on a main member side. Also, a connection piece 12d on the front frame side is engaged with a locking portion 12c on the main member side so as to become the case 12 as an integrated article. Then, the case 12 is mounted on the installation portion of the vehicle and the like using an attachment portion 12e provided in the front frame 12B. The inner space 12C opens in the front-and-back direction, and a front frame 12B side is set as the air outlet, and a back end side is set as the air inlet.

Inside the inner space 12C, the brackets 17A and 17B for the horizontal-type fin are mounted on an inside face of the right and left of the main member; and the brackets 19A and 19B for the vertical-type fins are mounted on an inner face of the top and bottom of the main member. In the brackets 17A and 17B, there are provided a shaft hole 17a on a front side (a side where the air is blown out to the outside), and an arc groove 17b on a back side (a back side in the inner space) facing each other respectively (see FIG. 11). The arc groove 17b has a gentle arc shape around the shaft hole 17a. On the other hand, in the brackets 19A and 19B, there are formed seven shaft holes 19a to 19g in a state facing on top and bottom. The shaft holes 19a to 19g are provided approximately at an equal interval. The shaft holes 19a to 19c and the shaft holes 19e to 19g are simple through-holes. On the other hand, the intermediate shaft hole 19d is formed in a groove shape having an approximately concave shape, i.e. a dovetail groove shape which can move shaft portions 16a of the later-described intermediate fin 16D in a bracket plate-width direction.

The fins 16A to 16G include the shaft portions 16a located on upper and lower end faces and protruding on the same shaft line respectively in an approximately middle in a plate width direction; and shaft portions 16b located on the upper end face, and projected in a step formed such that a back side where the shaft portion 16a does not protrude is formed in one step below. Among each shaft portion 16a, the upper and lower shaft portions 16a of the fins 16A to 16C and 16E to 16G are formed in a simple convex shape. On the other hand, each upper and lower shaft portion 16a of the intermediate fin 16D has a small-diameter neck movable along the dovetail groove shape of the aforementioned shaft hole 19d. The fins 16A to 16C and 16E to 16G are turnably supported in a state wherein the upper and lower shaft portions 16a are fitted into the corresponding circular shaft holes 19a to 19g of the brackets 19A and 19B. In the intermediate fin 16D, each upper and lower shaft portion 16a is supported turnably and movably to front and back in the shaft hole 19d having the dovetail groove shape of the brackets 19A and 19B.

Also, the fins 16A to 16G are operated to be connected by four links 14A to 14D forming the link mechanism 14. In the embodiment, the intermediate fin 16D positioned in a middle of right and left, and the first fins 16C and 16E disposed on both adjacent sides of the intermediate fin 16D are turnably connected by the two first links 14B and 14C. One first fin 16C, the second fin 16B located outside the first fin 16C, and the third fin 16A located outside the second fin 16B are turnably connected by the second link 14A. The other first fin 16E, the second fin 16F located outside the first fin 16E, and the third fin 16G located outside the second fin 16F are turnably connected by the second link 14D. Also, in the intermediate fin 16D, there is provided an arc groove 16d in an up-and-down direction on a front side in the plate width direction, and a portion between the arc groove 16d and a front edge portion becomes a graspable piece portion 16c. Incidentally, front edge sides of the first fins 16C and 16E and the piece portion 16c are formed in an arc shape.

Specifically, the first links 14B and 14C include shaft holes 14a and 14a provided on both end sides. Then, in one first link 14B, the shaft hole 14a on one end side fits into the shaft portion 16b of the first fin 16C, and the shaft hole 14a on the other end side fits into the shaft portion 16b of the intermediate fin 16D. In the other first link 14C, the shaft hole 14a on one end side fits into the shaft portion 16b of the intermediate fin 16D, and the shaft hole 14a on the other end side fits into the shaft portion 16b of the first fin 16E. Also, the second links 14A and 14D are made longer than the first links 14B and 14C, and include three shaft holes 14a respectively provided on both end sides and a middle. Then, in one second link 14A, the shaft hole 14a on one end side fits into the shaft portion 16b of the third fin 16A; the shaft hole 14a on the other end side fits into the shaft portion 16b of the first fin 16C; and the shaft hole 14a in the middle fits into the shaft portion 16b of the second fin 16B. In the other second link 14D, the shaft hole 14a on one end side fits into the shaft portion 16b of the third fin 16G; the shaft hole 14a on the other end side fits into the shaft portion 16b of the first fin 16E; and the shaft hole 14a in the middle fits into the shaft portion 16b of the second fin 16F.

The aforementioned horizontal-type fin 13 is turnably supported between the brackets 17A and 17B. Namely, the horizontal-type fin 13 includes shaft portions 13a and shaft portions 13b respectively projected on each right and left side face; a relief opening 13c located in an intermediate portion of the right and left, and provided on a back side; a control portion 13d formed such that a just-in-front side is formed one step thicker including an edge portion of the opening 13c; and a hole portion 13e provided in a middle of the control portion 13d. Then, the horizontal-type fin 13 is disposed between the brackets 17A and 17B approximately in parallel to the same brackets in a state wherein the shaft portions 13a on both sides are fitted into the corresponding shaft holes 17a, and the shaft portions 13b on both sides are fitted into the arc-shaped guide hole 17b. Consequently, the horizontal-type fin is supported such that the back side in the plate width direction is turnable in an up-and-down direction only at a predetermined angle according to the arc-shaped guide hole 17b as a supporting point of the shaft portion 13a. Incidentally, in the hole portion 13e, there is mounted an elastic member (not shown in the drawings) as needed. The elastic member is a member moderately pressed against the later-described operating knob 18 so as to prevent the knob 18 from unexpectedly shifting due to vibrations and the like.

Namely, in the horizontal-type fin 13, there is assembled the knob 18 to be movable to front and back only for a predetermined distance, and movable horizontally to right and left only for a predetermined distance at a foremost position. The knob 18 is formed by the upper knob 18A and the lower knob 18B sandwiching the fin 13 from top and bottom; and a decorative knob 18C located between both knobs 18A and 18B, and mounted on a front side. The upper and lower knobs 18A and 18B include approximately L-shaped piece portions 18a projected in a middle of right and left at a back edge; a step portion 18b provided in an opposed inner face to release the control portion 13d, and control a movement range of the knob 18; a wall portion 18c positioning the decorative knob 18C, and a latching wall 18d provided on a back side of the wall portion 18c to lock both end sides of the decorative knob 18C, respectively provided on an inner face front side of the lower knob 18B; claw portions 18e provided on both sides of the wall portion 18c to engage locking portions (not shown in the drawings) on an upper knob side; an engagement portion 18f provided on an inner face back side of the lower knob 18B to engage a corresponding portion on the upper knob side; and the like.

In the aforementioned knob 18, for example, the decorative knob 18C is attached relative to the lower knob 18B by locking both end portions in the latching wall 18d. After that, when the upper and lower knobs 18A and 18B are superimposed in such a way as to sandwich the fin 13 from top and bottom, the claw portions 18e on a lower knob side, and the engagement portion 18f respectively engage corresponding portions of the upper knob 18A so as to be integrated. As shown in FIG. 12(c), at an assembly time of the knob, each piece portion 18a of the upper and lower knobs is disposed in the arc groove 16d of the intermediate fin 16D. Consequently, in a state wherein the upper and lower knobs 18A and 18B are integrated, the knob 18 restrains the piece portion 16c of the intermediate fin 16D inside each piece portion 18a, and with a restraint aspect thereof, the knob 18 is connected or linked to the intermediate fin 16D.

(Operations) Hereinafter, the main operations of the airflow-direction adjustment device 10 made as mentioned above will be described.

(1) FIGS. 12(a) to 12(d), and FIGS. 15(a) to 15(c) show a state of the parallel air-blowing mode wherein each fin 16A to 16G becomes approximately parallel to the brackets 17, and becomes approximately parallel to each other. In that state, each link 14A to 14D is linearly disposed, and the knob 18 is disposed in an approximately right-and-left middle of the horizontal-type fin 13. In other words, in the parallel air-blowing mode, the knob 18 is at a usual position in FIGS. 12(a) to 12(d) relative to the horizontal-type fin 13, i.e. in a state wherein a horizontal portion on the just-in-front side of the control portion 13d is positioned at an intermediate portion which becomes longer in a horizontal direction of the step portion 18b.

Figure 13A:
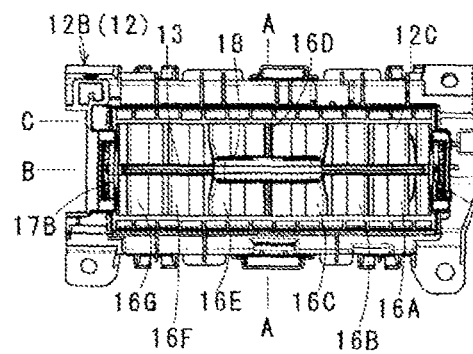
FIGS. 13(*a*) to 13(*d*) show the airflow-direction adjustment device in FIG. 10 in the scattered air-blowing mode state, wherein FIG. 13(*a*) is a front view.
Figure 13B:
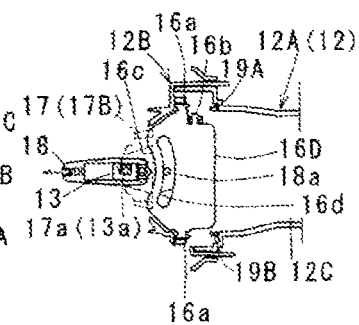
Figure 13C:
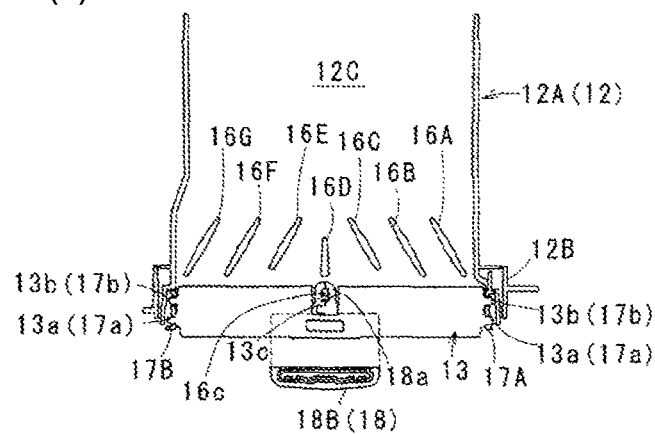
Figure 13D:
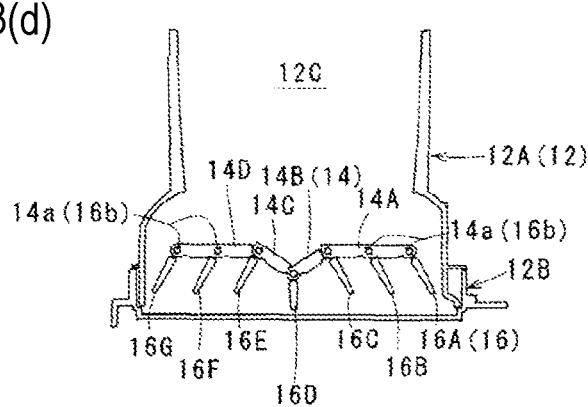

(2) FIGS. 13(a) to 13(d) show a state of the scattered air-blowing mode wherein the knob 18 is pulled in an arrow direction in FIG. 13(b) to maximum from the state of the parallel air-blowing mode so that the fins 16A to 16C, and the fins 16E to 16G are turned in the opposite directions. In other words, when the knob 18 is moved at a foremost position in FIG. 13(b) which is a just-in-front side relative to the horizontal-type fin 13 from the usual position in FIGS. 12(a) to 12(d), i.e. until a back side end face of the step portion 18b abuts against a corresponding end face on the just-in-front side of the control portion 13d, the intermediate fin 16D is pulled by the knob 18 so as to move forward along the dovetail groove shape of the shaft hole 19d. Due to the forward movement of the intermediate fin 16D, the piece portion 16c and the front side enter into the opening 13c to be released by maintaining a state approximately parallel to the brackets 17. In synchronization with that, the other fins 16A to 16C are turned through the first link 14B and the second link 14A, and the fins 16E to 16G are turned through the first link 14C and the second link 14E, respectively in the directions opposite to each other so as to be switched to the scattered air-blowing mode. Obviously, a turning angle of the fins 16A to 16C, or the fins 16E to 16G becomes an angle in proportion to a pulling quantity of the knob 18 so as to obtain various scattered air-blowing aspects.

(3) In a case of returning to the parallel air-blowing mode from the scattered air-blowing mode again, when the knob is pinched to operate to push, the intermediate fin 16D moves up to the original usual position. In synchronization with that, the other fins 16A to 16G are switched to the parallel air-blowing mode which is the state approximately parallel to the brackets 17 through the corresponding links 14A to 14D as well. In another method, one of the fins 16A to 16C, or the fins 16E to 16G is pinched to directly turn the fin thereof so as to switch from the scattered air-blowing mode to the parallel air-blowing mode as well. Consequently, the aforementioned structure excels in usability as well.

Figure 14A:
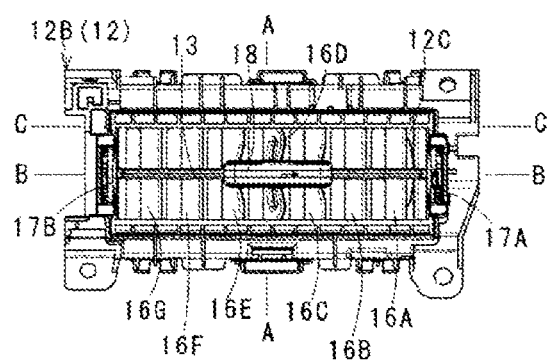
FIGS. 14(*a*) to 14(*d*) show the airflow-direction adjustment device in FIG. 10 in an inclined air-blowing mode state, wherein FIG. 14(*a*) is a front view.
Figure 14B:
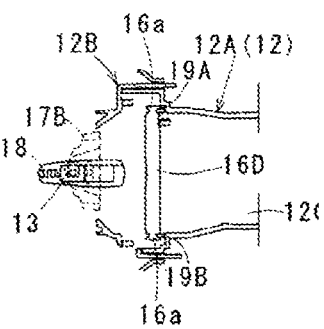
Figure 14C:
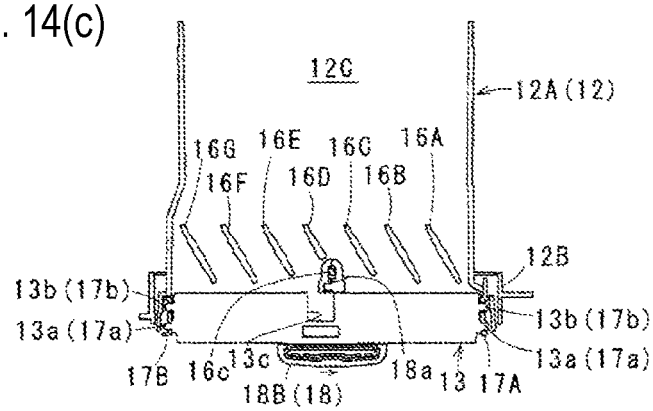
Figure 14D:
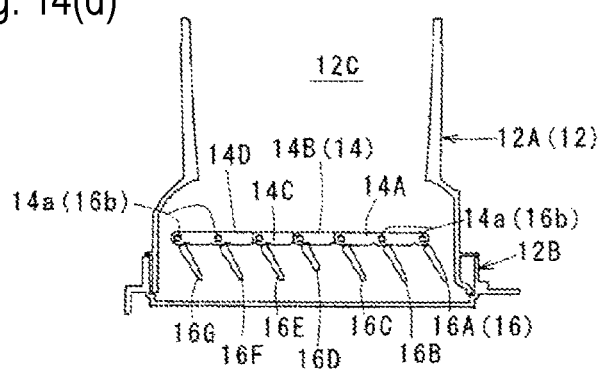

(4) FIGS. 14(a) to 14(d) show a state of the inclined air-blowing mode wherein the knob 18 is moved horizontally to a maximum in an arrow direction in FIG. 14(c) from the state of the parallel air-blowing mode so that all fins 16A to 16G become non-parallel to the brackets 17, and are turned approximately in the same direction to be inclined. In other words, in the state of the parallel air-blowing mode which is the usual position, when the knob 18 is moved to a right or left side which is the horizontal direction, i.e. until an end face of a portion extending to the right and left of the step portion 18b abuts against a corresponding end face on the just-in-front side of the control portion 13d, the intermediate fin 16D is turned in a direction corresponding to a moving direction of the knob 18 as a supporting point of the upper and lower shaft portions 16a so as to become an inclined state which becomes non-parallel to the brackets 17. In synchronization with that, the other fins 16A to 16C are turned through the first link 14B and the second link 14A, and the fins 16E to 16G are turned through the first link 14C and the second link 14E, respectively in the same direction as the fin 16D so as to be switched to the inclined air-blowing mode which becomes non-parallel to the brackets 17. Incidentally, the inclined air-blowing mode can be also called as a neck-swinging air-blowing mode since each fin 16A to 16G comes to have an angle in proportion to a degree of a horizontal movement of the knob 18, or a turning degree of each fin 16.

(5) In the aforementioned embodiment, the knob 18 is supported movably to the front and back and the right and left relative to the single horizontal-type fin 13 so as to simplify a support structure of the knob, and as shown in FIGS. 15(a) to 15(c), only by designing a turning structure of the horizontal-type fin 13 relative to the brackets 17, an air-blowing aspect can be modified furthermore according to a position of the fin 13 thereof. Namely, FIG. 15(b) shows a state wherein the fin 13 is pushed downward which is an arrow direction in the same drawing. In that case, the fin 13 is turned counterclockwise as the supporting point of the shaft portion 13a until the shaft portion 13b abuts against an upper inner end of the arc groove 17b to be controlled relative to the brackets 17 on both sides so as to become an upward inclined state. FIG. 15(c) shows a state wherein the fin 13 is pushed downward which is an arrow direction in the same drawing. In that case, the fin 13 is turned clockwise as the supporting point of the shaft portion 13a until the shaft portion 13b abuts against a lower inner end of the arc groove 17b to be controlled relative to the brackets 17 on both sides so as to become a downward inclined state. In any aspect of the upward inclined state and the downward inclined state, the fin 13 maintains the aforementioned states by lightly abutting against a curved face of the arc shape provided on the front edge side of the first fins 16C and 16E, and (the piece portion 16c of) the intermediate fin 16D, so that the fin 13 is returned to a horizontal state in FIG. 15(a) by pushing the fin 13 in a direction opposite to the arrows.

Incidentally, in the airflow-direction adjustment device of the present invention, the details can be modified or developed with reference to the aforementioned explanation provided that they comprise the structures specified in the aforementioned aspects. As for one example, there is shown the structure wherein the front frame is attached to the main member later; however, the front frame may be omitted, or the shape of the main member or the shape of the front frame are optional as well. Also, in the first embodiment, the vertical-type fins can be omitted, or in the second embodiment, the horizontal-type fin can be made as a non-moving type which does not move.

All contents of the specification, claims, drawings, and abstract of Japanese Patent Application No. 2013-256623 filed on Dec. 12, 2013 are cited in their entireties herein and are incorporated as a disclosure of the specification of the present invention.

What is claimed is:

1. An airflow-direction adjustment device, comprising:
 a case having a front-side opening portion to blow out air to an outside;
 a plurality of vertical fins having upper and lower ends pivotally supported relative to opposed support portions inside the case, the plurality of vertical fins including an intermediate fin disposed in a middle among the plurality of vertical fins, first and second first-fins disposed, respectively, on one side and another side opposite to the one side relative to the intermediate fin, and first and second second-fins, the first second-fin being disposed on one side of the first first-fin away from the intermediate fin and the second second-fin being disposed on one side of the second first-fin away from the intermediate fin;

a horizontal fin pivotally supported to the case and arranged in front of the plurality of vertical fins;

a link mechanism associating the plurality of vertical fins, the link mechanism including first and second first-links, each having one end and another end, one end of the first first-link being pivotally connected to the first first-fin and another end of the first first-link being pivotally connected to the intermediate fin, one end of the second first-link being pivotally connected to the second first-fin and another end of the second first-link being pivotally connected to the intermediate fin, and first and second second-links, each having one end and another end, one end of the first second-link being pivotally connected to the one end of the first first-link and another end of the first second-link being pivotally connected to the first second-fin, one end of the second second-link being pivotally connected to the second first-link and another end of the second second-fin being pivotally connected to the second second-fin; and an operating knob connected to the horizontal fin and supported movably in a front-and-back direction perpendicular to a horizontal direction where the horizontal fin extends so as to adjustably switch between a parallel air-blowing mode wherein the plurality of vertical fins becomes substantially parallel to each other, and a scattered air-blowing mode wherein the plurality of vertical fins is turned in a direction opposite to each other through the knob, the operating knob in the parallel air-blowing mode being movable in the horizontal direction so as to switch to an inclined air-blowing mode wherein the plurality of vertical fins turns in a substantially same direction and becomes non-parallel to the support portions, wherein when the knob is operated to move from front to back, the knob switches the first and second first-fins and the first and second second-fins from the scattered air-blowing mode to the parallel air-blowing mode causing the plurality of vertical fins to be substantially parallel to the support portions through the link mechanism.

2. An airflow-direction adjustment device according to claim 1, wherein the plurality of fins further includes first and second third-fins disposed outside the first and second second-fins relative to the intermediate fin, and the first second-link pivotally connecting the first-fin, the first second-fin, and the first third-fin, and the second second-link pivotally connecting the second first-fin, the second second-fin and the second third-fin.

3. An airflow-direction adjustment device according to claim 2, wherein in a state moved forward, the knob is operated to be pushed backward to switch the first and second first-fins to the first and second third-fins from the scattered air-blowing mode to the parallel air-blowing mode.

4. An airflow-direction adjustment device according to claim 1, wherein the horizontal fin further includes a relief opening facing the intermediate fin so that when the knob is in the scattered air-blowing mode, the relief opening receives the intermediate fin, and when the knob is switched from the scattered air-blowing mode to the parallel air-blowing mode, the intermediate fin moves away from the relief opening.

* * * * *